United States Patent [19]

Reick

[11] 4,053,443

[45] Oct. 11, 1977

[54] SEALING COMPOUND

[75] Inventor: Franklin G. Reick, Westwood, N.J.

[73] Assignee: Michael Ebert, Mamaroneck, N.Y.; a part interest

[21] Appl. No.: 707,014

[22] Filed: July 20, 1976

[51] Int. Cl.² ............................................. C08L 27/18
[52] U.S. Cl. .................... 260/29.6 F; 260/29.6 RW; 260/29.6 PM; 260/29.6 PT
[58] Field of Search ................. 260/29.6 F, 29.6 RW, 260/900, 29.6 PM, 29.6 PT

[56] References Cited

U.S. PATENT DOCUMENTS

| | | | |
|---|---|---|---|
| 2,976,203 | 3/1961 | Young et al. | 260/29.6 PM |
| 3,772,249 | 11/1973 | Morgans | 260/900 |
| 3,823,108 | 7/1974 | Bissot | 260/29.6 PM |
| 3,862,066 | 1/1975 | Reiter et al. | 260/29.6 PM |
| 3,879,302 | 4/1975 | Reick | 252/25 |

FOREIGN PATENT DOCUMENTS

| | | | |
|---|---|---|---|
| 997,096 | 6/1965 | United Kingdom | 260/29.6 F |

*Primary Examiner*—M. J. Welsh

[57] ABSTRACT

A sealing compound for pipe joints which has a paste-like consistency and is formulated from inert filler particles, an aqueous dispersion of fluorocarbon particles, an acidic gelling agent and an alkali activator for the gelling agent in a relative quantity producing a neutral pH, the activator including an ingredient which imparts freeze-thaw stability to the compound.

8 Claims, No Drawings

SEALING COMPOUND

BACKGROUND OF THE INVENTION

This invention relates generally to sealing compounds for pipe joints and the like and more particularly to a fluorocarbon based sealing compound in the form of a thixotropic paste capable of sealing any threaded joint and suitable for oxygen and food service.

To prevent or minimize leakage of a fluid through mechanical clearances use is made of a packing material. Where the clearance is that existing between the threaded end of a pipe received within an internally-threaded pipe joint or fitting, it is the common practice to apply a sealing compound of "dope" to the threads of the pipe before it is screwed into the joint or fitting.

One common type of sealing compound for this purpose is formed by a mixture of linseed or mineral oil, plasticizers and fine clay particles. These widely used compounds have a number of disadvantages; for when the oil dries out, the sealant cakes and becomes less effective. Also, should the pipe coupling rust, it may be difficult or impossible to disassemble the joint.

Another commercially available type of sealing compound makes use of fine asbestos particles as a filler, but this is objectionable because of the hazardous aspect of asbestos. Some sealing compounds incorporate granular particles of "Teflon" in an oil carrier to improve the lubricity of the compound. However, such compounds are subject to oxidation, volatilization and other drawbacks.

In recent years, pipe thread sealant tapes have become commercially available, such tapes being made from an extruded, unsintered Teflon TFE-fluorocarbon resin. This tape, which is non-flammable, non-toxic, and self-lubricating, is intended as a replacement for dopes to seal threaded connections on pipes made of plastic, iron and steel, copper, brass, aluminum and other materials. Because Teflon has a unique combination of electrical, chemical, temperature and low-friction properties (see U.S. Pat. No. 2,230,654), it may be used as a pipe sealant in environments which preclude conventional dopes, such as in hard-to-deal gas or liquid lines employed in the chemical and petrochemical industries, in lines carrying liquid oxygen, nitric and other acids, or in lines conducting caustics and other corrosives.

Unlike liquid or paste dopes that burn, spill or cake, a tape sealant is easy to use, for one merely lays the end of the tape on the pipe, starting near the end, the tape then being wrapped around in the direction of the threads. With a thread sealant tape formed of Teflon, threaded pipe joints will not seize and they can be disassembled easily. This is important in threaded joints requiring subsequent disassembly, such as those included in test gauges and in heating, air conditioning and fuel systems.

While Teflon tape has many advantages over standard sealing compounds or dopes, it has several drawbacks, some of which are relatively serious. Unless the tape is wrapped in the proper direction about the pipe threads, it will unravel when the joint is run up. Also, if the pipe end is improperly covered, tramp fragments of tape will get into the system and may plug orifices and valves. Because the tape is fabricated of pure Teflon, it has a strong tendency to cold flow, producing clearances, causing leakage. Moreover, when a taped joint is disassembled, the tape unravels and must be picked off the threads for remake.

In my prior U.S. Pat. No. 3,879,302 there is disclosed a sealing compound which overcomes many of the drawbacks inherent in known types of sealing compounds or Teflon tapes. The sealing compound disclosed in my prior patent is formulated from particles of inert filler material intermingled with an aqueous dispersion of microfine fluorocarbon powders, the dispersion being stabilized by a charge-neutralizing agent such as silane, which prevents clotting of the powders.

While my prior patented compound is useful in a number of situations, there are certain applications where it is not acceptable, as in food processing plants. It is essential for food processing that the pipe sealant for the plumbing be non-contaminating and physiologically inert. Also it is important in this and in other applications that the compound even though subject to freezing, have freeze-thaw stability so that its properties are unaffected by repeated cycles of freezing and thawing. While the use of silanes to impart freeze-thaw characteristics to a sealing compound is acceptable in many applications, its use is objectionable in food processing environment.

SUMMARY OF INVENTION

In view of the foregoing, it is the main object of this invention to provide a fluorocarbon-based sealing compound in the form of a thixotropic paste capable of sealing any threaded joint regardless of the nature of the joint material.

More particularly, it is an object of the invention to provide a sealant that is noncontaminating and physiologically inert, so that it may be used as a sealing compound in federally-inspected food processing installations as well as in a range of other applications, such as oxygen service, vacuum service and in ammonia and freon refrigeration service.

A significant feature of the present invention is that the sealing compound is compatible with any pipe material, including all irons, steels, aluminums, zinc, plastics, lead and glass, the compound being inert to all conveyed media with few exceptions such as molten alkali metals.

Yet another object of the invention is to provide a sealing compound in paste form which is easy to apply, for the user does not have to consider the direction of application, as with tape. Moreover, while a fragment of sealing tape which gets into the system may plug orifices and valves, should some sealing paste be introduced, it will be chewed up therein and have no adverse affect.

Still another object of the invention is to provide a fluorocarbon-based sealing compound which contains a mixture of Teflon particles in microscopic and colloidal sizes whereby the paste is effective in sealing pipes in which the threads are mismatched.

Briefly stated, a compound in accordance with the invention is formulated from inert filler particles, preferably a mixture of plate-like and fine particles, intermingled with a dispersion of lubricating fluorocarbon particles of colloidal size intermingled with particles of microscopic size, the filler and lubricating particles being distributed in an acidic gelling agent which is activated by an alkali in a quantity sufficient to render the paste pH neutral, the alkali being constituted by a mixture of ingredients which render the compound freeze-thaw stable.

DESCRIPTION OF THE INVENTION

The fluorocarbon-based sealing compound in accordance with the invention includes an aqueous dispersion of Teflon particles in microfine or submicronic sizes, such as Du Pont's TFE-42 or T-30 dispersions in which the particles are less than one micron in size. Teflon 30 (T-30) which is preferred is a milky white liquid consisting of minute particles of tetrafluoroethylene resin suspended in water. Fundamentally, the polymer in the dispersion is exactly the same as the polymer supplied in powder form for molding or extrusion (except for particle size) and has the inherent properties of Teflon tetrafluoroethylene resin. Teflon 30 dispersion contains 59 to 61 percent (by weight) tetrafluoroethylene resin with 5.5 to 6.5 percent of this weight as Triton $\times$ 100 (Rohm and Haas, Inc.), a nonionic wetting agent.

The microfine Teflon particles are intermingled with Teflon particles of fine size to produce a lubricating particle mixture suitable for a sealing compound to be introduced into pipe joints where the threads are somewhat mismatched. By fine Teflon particles, as distinguished from colloidal or microfine particles, is meant a Teflon powder in the microscopic range.

Where only colloidal-size Teflon particles are used, as in my above-identified prior patent, the compound does not adequately seal the interstices of the mismatched elements, and some capillary leakage may be experienced. But by mixing fine Teflon particles with colloidal particles of the same material, the resultant packing prevents any leakage.

Added to the Teflon aqueous dispersion is a surfactant which is preferably Triton $\times$ 100, Triton being the trademark for surfactants based on alkylaryl polyether alcohols, sulfonates and sulfates.

The mineral filler which is used in combination with the Teflon lubricating particle mixture is preferably a mixture of inert particles having a sheet or plate-like configuration and inert particles having a needle-like formation. The former is provided by water-ground mica, and the latter by fine particles of silica such as Santocell C (Santocell is the trademark of Monsanto for a series of silica aerogels.

Also included in the formulation is white titanium dioxide powder ($T_1O_2$) which, because of its whisker-like formation, functions not only as a coloring agent to impart a desirable white appearance to the paste, but also as an inert mineral filler.

To effectively disperse the mineral filler mixture in the compound, use is made of an alkali peptizing agent which is preferably trisodium phosphate. These take the form of colorless crystals, which are soluble in water. In order to impart paste-like flow characteristics to the compound use is made of an acidic gelling agent, preferably Carbopol, which is the trademark of B. F. Goodrich Chemical Co. for water-soluble resins having excellent gel-forming properties.

To activate the acidic gelling agent, use is made of a mixture of alkalis, the mixture being constituted by sodium hydroxide (NaOH) and monoethanolamine (MEA) which is a strong base miscible with water. The amount of alkali used relative to the acidic gelling agent is such as to render the compound pH neutral. The reason for the MEA is that it has been found that when this ingredient is combined with sodium hydroxide, the resultant compound has excellent freeze-thaw stability, and without this ingredient, a freezing and thawing cycle will alter the properties of the compound.

The preferred procedure for formulating the sealing compound is as follows:

Step A. In this step, the following ingredients are thoroughly intermingled to form solution A:
Water—8 quarts
Triton $\times$ 100—1¼ pounds
Mica—2 pounds
$T_1O_2$—4 pounds
Teflon fine powder (microscopic size)—3 pounds
Santocell C—¼ pound.

Step B. In this step, the following ingredients are used to form solution B:
Carbopol—1½ pounds
Water—8 quarts The Carbopol is permitted to soak in water for about 24 hours.

Step C. Solution A is then intermingled with the Solution B in a pump in which the resultant Solution C is pumped at least four times through a mesh screen which functions to cut up any clumps of gell that may have formed.

Step D. Solution C is then intermixed with 16 quarts of a T-30 Teflon colloidal dispersion and passed twice through a mixing pump to assure a fully dispersed Solution D.

Step E. The following ingredients are intermixed by hand to provide mixture E.
Tri Sodium Phosphate—½ pound
Sodium hydroxide—2 pounds
Monoethanolamine—⅜ pound.

Step F. Mixture E is then intermingled with Solution D by running it through a mixing pump at least four times to produce a sealing compound in accordance with the invention having a paste-like consistency. This paste is then aged about two days and packed in a squeeze tube or other container.

While there have been shown and described preferred embodiments of a Sealing Compound in accordance with the invention, it will be appreciated that many changes and modifications may be made therein without, however, departing from the essential spirit thereof.

I claim:

1. A sealing composition comprising an inert filler, an aqueous dispersion of polymers of tetrafluoroethylene lubricating particles in which particles of colloidal size are intermingled with particles of microscopic size, an acidic gelling agent, and an alkali activator for the gelling agent, said activator including an ingredient which renders the compound freeze-thaw stable.

2. A sealing composition as set forth in claim 1, wherein said inert filler includes mica particles.

3. A sealing composition as set forth in claim 2, wherein said mica particles are intermingled with silica particles.

4. A sealing composition as set forth in claim 3, wherein said inert filler further includes titanium oxide powder.

5. A sealing composition as set forth in claim 1, further including a peptizing agent to disperse the filler.

6. A sealing composition as set forth in claim 1, wherein said gelling agent is a water-soluble resin.

7. A sealing composition as set forth in claim 1, wherein said ingredient in said activator is monoethanolamine.

8. A sealing composition as set forth in claim 7, wherein said activator further includes sodium hydroxide.

* * * * *